July 2, 1935.　　　R. S. SANFORD　　　2,006,412
CONTROL MECHANISM
Filed Aug. 28, 1931
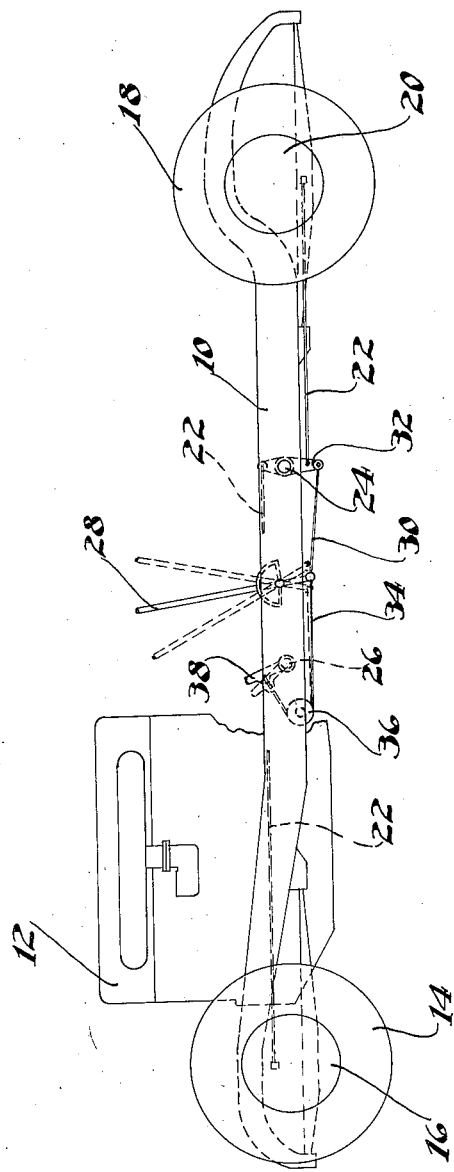
INVENTOR.
ROY S. SANFORD
BY
ATTORNEY Patented July 2, 1935

2,006,412

UNITED STATES PATENT OFFICE 2,006,412

CONTROL MECHANISM

Roy S. Sanford, South Bend, Ind., assignor to Bragg-Kliesrath Corporation, South Bend, Ind., a corporation of New York Application August 28, 1931, Serial No. 560,006

1 Claim. (Cl. 192—13)

This invention relates to control mechanism for automobiles, and is illustrated as embodied in an automobile chassis having novel control mechanism for the clutch and brake. An object of the invention is to provide simple emergency operating means for actuating either the clutch or the brakes in case of failure of the regular service operating means of either the clutch or the brakes. This is especially desirable when power is used for operating the clutch and the brakes, as it provides a safeguard if the power fails for any reason.

In the arrangement illustrated, driver-operated means, such as an emergency hand lever, is arranged to operate the clutch when moved in one direction and to operate the brakes when moved in the other direction.

The above and other objects and features of the invention, including various novel combinations of parts and desirable particular constructions, will be apparent from the following description of the illustrative embodiment shown in the accompanying drawing, in which:

The figure is a diagrammatic side elevation of an automobile chassis embodying one form of the invention.

The illustrated chassis includes a frame 10 carrying an engine 12 and supported on front wheels 14 having brakes 16 and on rear wheels 18 having brakes 20. The brakes 16 and 20 are arranged to be operated by suitable connections 22 from a central cross-shaft 24. The usual clutch of the automobile is operated by a shaft 26.

The present invention relates to the provision of simple emergency operating means for the brakes and clutch, it being the intention to operate the brakes and clutch for ordinary service use by driver-controlled power means which in itself forms no part of this invention and which is therefore not illustrated.

I prefer to provide, for this emergency use, driver-operated means such as an emergency hand lever 28, connected by means such as cable 30 to a lever 32 fixed on the brake shaft 24, and connected by means such as a cable 34 passing over a fixed-axis pulley 36 to a lever 38 fixed on the clutch shaft 26.

By this arrangement, forcing lever 28 forward throws out the clutch, while pulling it backward operates the four-wheel brakes 16 and 20. Lever 28 may if desired have a ratchet as usually provided for emergency brake levers.

A suitable system of power means for operating the clutch and brake, with which my invention may be used, is disclosed and claimed in application No. 557,242, filed August 15, 1931, by Victor W. Kliesrath.

While one illustrative embodiment has been described in detail, it is not my intention to limit the scope of the invention to that particular embodiment, or otherwise than by the terms of the appended claim.

I claim:

Speed control mechanism for an automotive vehicle comprising a clutch operating pedal and brake mechanism, a direction-changing element positioned adjacent said pedal, a flexible connecting element providing a substantially straight line connection between said pedal and brake mechanism and passing around said direction-changing element, together with a manually operable lever member connected at one of its ends to said connecting element at a point intermediate said brake mechanism and direction-changing element whereby with operation of said lever member in one direction the clutch pedal is angularly moved to disengage the clutch and with operation of said lever member in another direction the brakes are applied.

ROY S. SANFORD.